United States Patent [19]
Lee

[11] Patent Number: 6,055,397
[45] Date of Patent: Apr. 25, 2000

[54] PHOTORECEPTOR WEB STEERING APPARATUS FOR PRINTER

[75] Inventor: Jong-chan Lee, Suwon, Rep. of Korea

[73] Assignee: Samsung Electronics Co., Ltd., Kyungki-do, Rep. of Korea

[21] Appl. No.: 09/090,888

[22] Filed: Jun. 5, 1998

[30] Foreign Application Priority Data

Dec. 11, 1997 [KR] Rep. of Korea ............. 97-67747

[51] Int. Cl.[7] ......................................... G03G 15/00
[52] U.S. Cl. .................................................. 399/165
[58] Field of Search ............................... 399/162, 165, 399/167; 242/615.2, 615.1; 226/180, 21, 19, 20; 474/6, 103, 107, 108, 122, 123, 124, 184, 188, 166, 167, 102–106; 198/806, 807

[56] References Cited

U.S. PATENT DOCUMENTS

| | | |
|---|---|---|
| 5,078,263 | 1/1992 | Thompson et al. ............ 198/807 |
| 5,244,435 | 9/1993 | Billett .......................... 474/184 |
| 5,246,099 | 9/1993 | Genovese . |
| 5,316,524 | 5/1994 | Wong et al. . |
| 5,659,851 | 8/1997 | Moe et al. . |

FOREIGN PATENT DOCUMENTS

| | | |
|---|---|---|
| 075 398 | 3/1983 | European Pat. Off. . |
| 458 260 | 11/1991 | European Pat. Off. . |

*Primary Examiner*—Fred L. Braun
*Assistant Examiner*—Greg Moldafsky
*Attorney, Agent, or Firm*—Sughrue, Mion, Zinn, Macpeak & Seas, PLLC

[57] ABSTRACT

In a photoreceptor web steering apparatus for a printer having a frame, a shaft is rotatably installed at the frame, and a guide roller for guiding the circulation of the photoreceptor web as a portion of the outer circumference of the guide roller which contacts the photoreceptor web, is rotatably installed at the shaft. A steering roller is arranged at the shaft next to the guide roller and includes a spacer installed to tilt at a predetermined angle with respect to the outer circumferential direction of the shaft, and a tilting shell rotatably installed on the outer circumference of the spacer and having the outer circumferential surface thereof being in contact with the photoreceptor web. The steering roller corrects a lateral slip of the photoreceptor web contacting the outer circumference of the tilting shell by changing the inclination direction of the tilting shell according to a pivot angle of the shaft. A driving unit installed between the frame and the shaft, controls the degree of pivot of the shaft.

8 Claims, 5 Drawing Sheets

PHOTORECEPTOR WEB STEERING APPARATUS FOR PRINTER

BACKGROUND OF THE INVENTION

1. Field of the Invention

The present invention relates to a photoreceptor web steering apparatus for preventing the lateral slip of a photoreceptor web used in a printer, and more particularly, to a photoreceptor web steering apparatus for a printer having an improved structure so that a lateral slip of the photoreceptor web is prevented without tilting the rollers supporting the photoreceptor web.

2. Description of the Related Art

In a printer such as a laser printer, a laser beam scans a photoreceptive medium to form a latent electrostatic image. The latent electrostatic image is developed with a toner of a predetermined color using a development unit and then the developed image is transferred to a printing paper.

Referring to FIG. 1, a general printer has a photoreceptor web 10 circulating around a driving roller 20, a transfer backup roller 30, and a steering roller 41, which are installed in a main body of the printer.

Near the photoreceptor web 10, there is an erasing lamp 60 for erasing a surface electrical potential formed on the photoreceptor web 10 by emitting a light beam, a charger 70 for charging the photoreceptor web 10 from which the surface electrical potential has been removed to a predetermined electrical potential, a plurality of laser scanning units 80 for forming a latent electrostatic image corresponding to each color by scanning the photoreceptor web 10 using a laser beam, and a plurality of development units 90 for developing a portion of the photoreceptor web 10 having the latent electrostatic image.

In a printer having the above structure, since the photoreceptor web 10 is operated while being wound around the respective rollers 20, 30 and 41, a lateral slip of the photoreceptor web 10 in a longitudinal direction of the rollers 20, 30 and 41 is possible.

Thus, the printer includes a lateral slip detecting sensor (not shown) for detecting a lateral slip of the photoreceptor web 10, and a photoreceptor web steering apparatus 40 for correcting the lateral slip.

Referring to FIGS. 1 and 2, a conventional photoreceptor web steering apparatus 40 includes a frame 42 installed at a printer main body 1, a pivot member 46 installed at the frame 42 capable of pivoting, a steering roller 41 installed at the pivot member 46 to support the photoreceptor web 10 to circulate along a predetermined path, a pair of stabilizing rollers 43 installed at the frame 42 to flatten the photoreceptor web 10 passing after the steering roller 41, and an adjusting unit 50 installed at the printer main body 1 to adjust the tilt of the steering roller 41 in upward and downward directions as indicated by arrow "A".

The pivot member 46 is coupled to a pivot bar 44 which is elastically coupled to the frame 42 by a coupling pin 47 so as to be capable of pivoting around a portion where the coupling pin 47 is coupled to a surface of the pivot member 46 in the X-Y plane. The pivot member 46 pivots in a direction to compensate for uneven pressure being applied to a contact portion between the steering roller 41 and the photoreceptor web 10 by an elastic member 45 interposed between the pivot bar 44 and the frame 42. A rotational shaft 41a of the steering roller 41 is coupled to an installation groove 46a formed in the pivot member 46. An elastic piece 48 is installed at the installation groove 46a to support the rotational shaft 41a of the steering roller 41 by pressing the rotational shaft 41a.

The adjusting unit 50 includes a driving motor 53 fixed to a frame 3, the cam member 51 coupled to the rotational shaft 54 of the driving motor 53 and having a cam groove 52, and a pivot guide protrusion 49 coupled to the pivot member 46 and inserted into the cam groove 52. Thus, as the driving motor 53 rotates, the position of the cam groove 52 varies so that the height of the pivot guide protrusion 49 changes. Accordingly, the steering roller 41 pivots around the pivot bar 44 in the directions indicated by arrow "A".

Therefore, when a lateral slip of the photoreceptor web 10 is detected by the lateral-slip detecting sensor, the steering roller 41 is tilted according to the position of the cam member 51. As a result, as the photoreceptor web 10 moves in a latitudinal direction, the lateral slip is corrected.

The respective stabilizing rollers 43 are installed at the frame 42 parallel to the steering roller 41 and contact a portion of the photoreceptor web 10 proceeding toward the steering roller 41 and a portion of the photoreceptor web 10 having passed the steering roller 41 to prevent wrinkles of the photoreceptor web 10. Also, the stabilizing rollers 43 allow the change in height of the photoreceptor web 10 according to the steering so as not to affect the laser scanning unit 80.

However, in the conventional photoreceptor web steering apparatus having the above structure, wrinkles of the photoreceptor web 10 may easily occur since the entire steering apparatus 40 is tilted to correct the lateral slip of the photoreceptor web 10. Thus, since two stabilizing rollers 43 are required and since the distance between the stabilizing rollers 43 and the steering roller 41, "x" in FIG. 1, should be large enough to flatten the wrinkles of the photoreceptor web 10 by the steering roller 41, miniaturization of the printer is limited.

Further, since the elastic member 45 interposed between the pivot bar 44 and the frame 42 applies tension to the photoreceptor web 10, in ensuring the removal of the tensions, the installation structure becomes complicated.

SUMMARY OF THE INVENTION

To solve the above problems, it is an objective of the present invention to provide a photoreceptor web steering apparatus for a printer in which a lateral slip of the photoreceptor web can be corrected without tilting the rollers supporting the photoreceptor web.

Accordingly, to achieve the above objective, there is provided a photoreceptor web steering apparatus for a printer which includes a frame; a shaft rotatably installed at the frame; a guide roller, rotatably installed at the shaft, for guiding the circulation of the photoreceptor web as a portion of the outer circumference of the guide roller contacts the photoreceptor web; a steering roller, arranged at the shaft next to the guide roller and comprising a spacer installed to tilt to a predetermined angle with respect to the outer circumferential direction of the shaft, and a tilting shell rotatably installed on the outer circumference of the spacer and having the outer circumferential surface thereof being in contact with the photoreceptor web, for correcting a lateral slip of the photoreceptor web contacting the outer circumference of the tilting shell by changing the inclination direction of the tilting shell according to a pivot angle of the shaft; and a driving means, installed between the frame and the shaft, for controlling the degree of pivot of the shaft.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
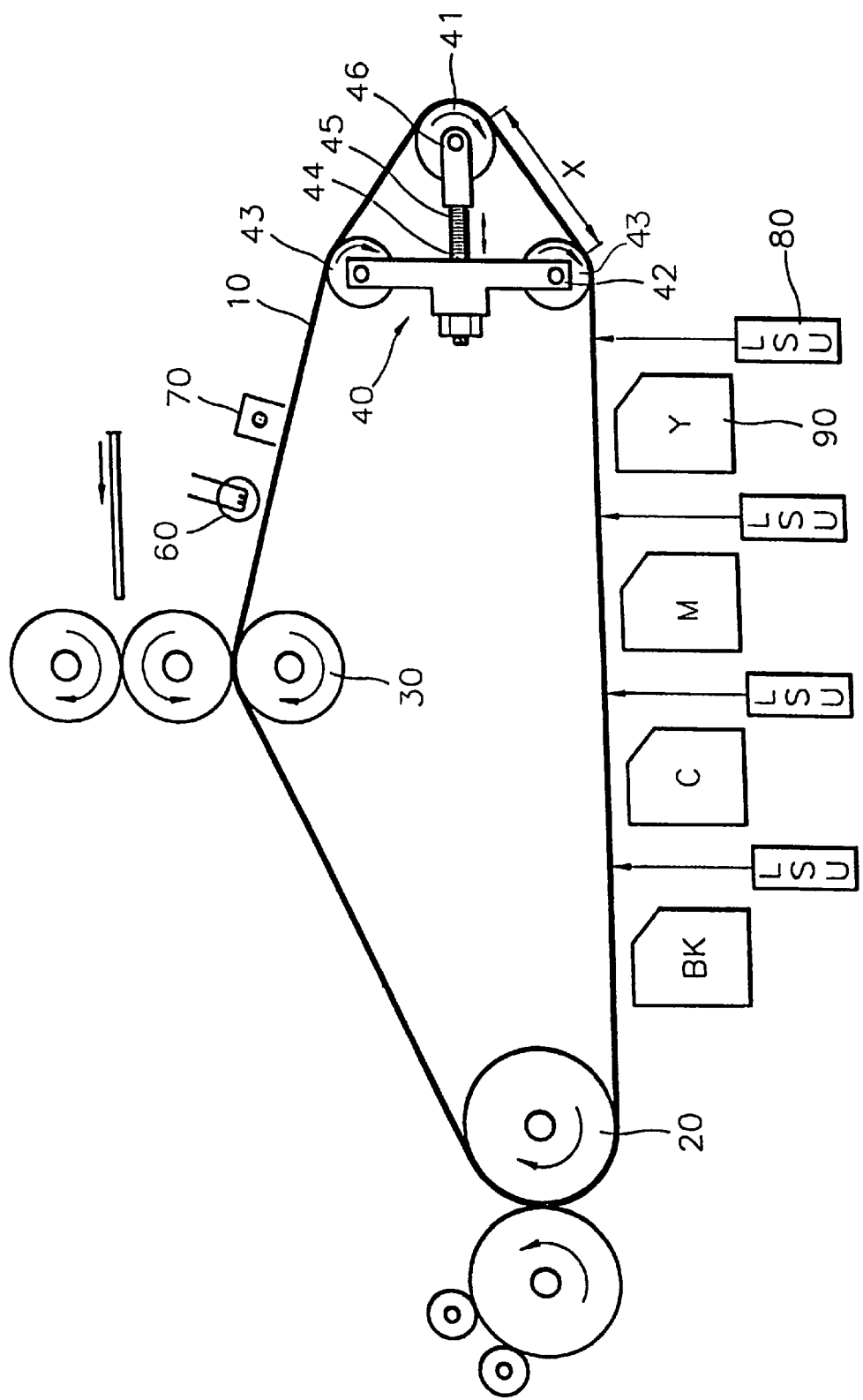
FIG. 1 is a diagram schematically showing a structure of a printer employing a conventional photoreceptor web steering apparatus.
Figure 2:
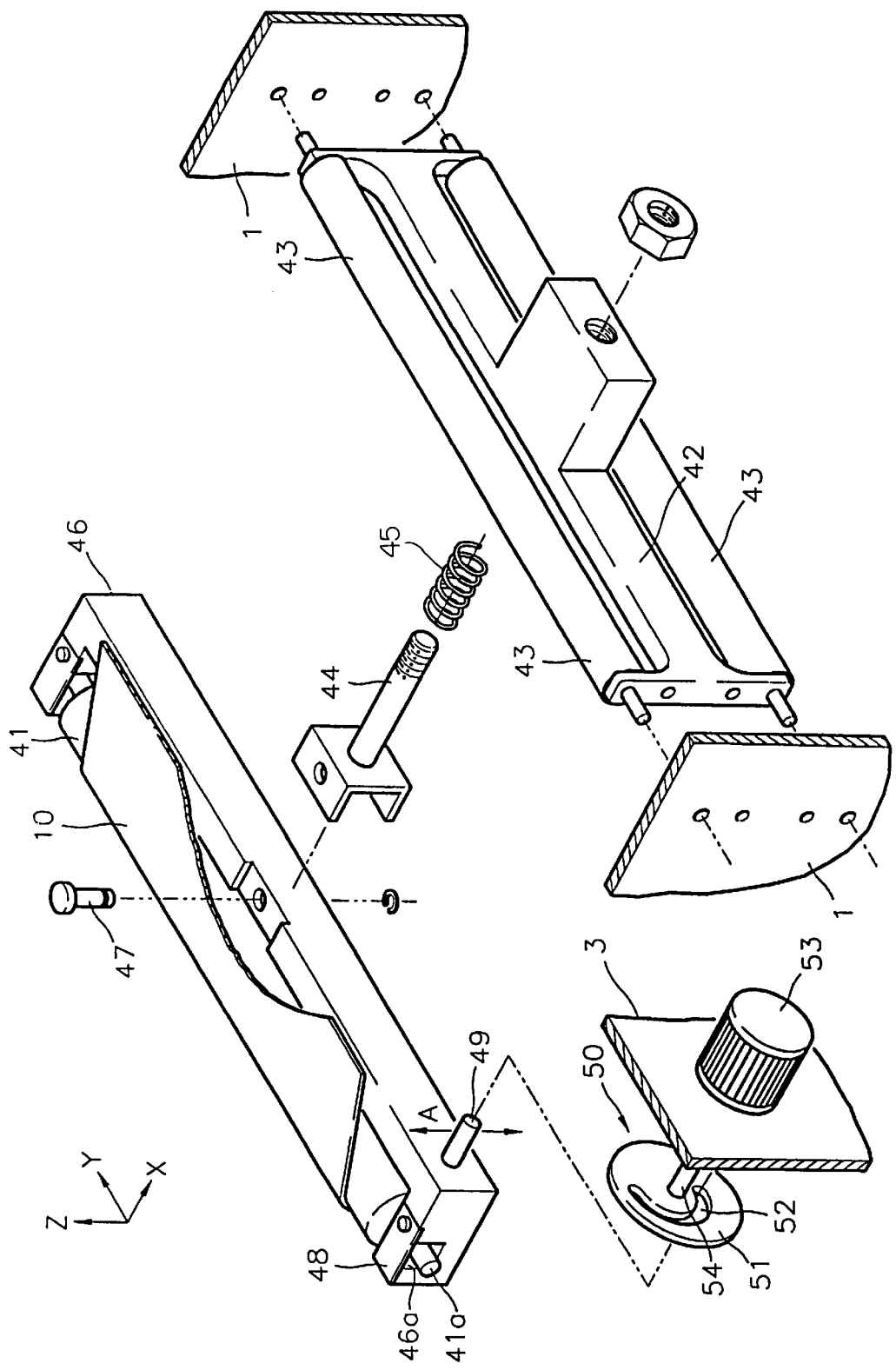
FIG. 2 is an exploded perspective view illustrating the conventional photoreceptor web steering apparatus.
Figure 3:
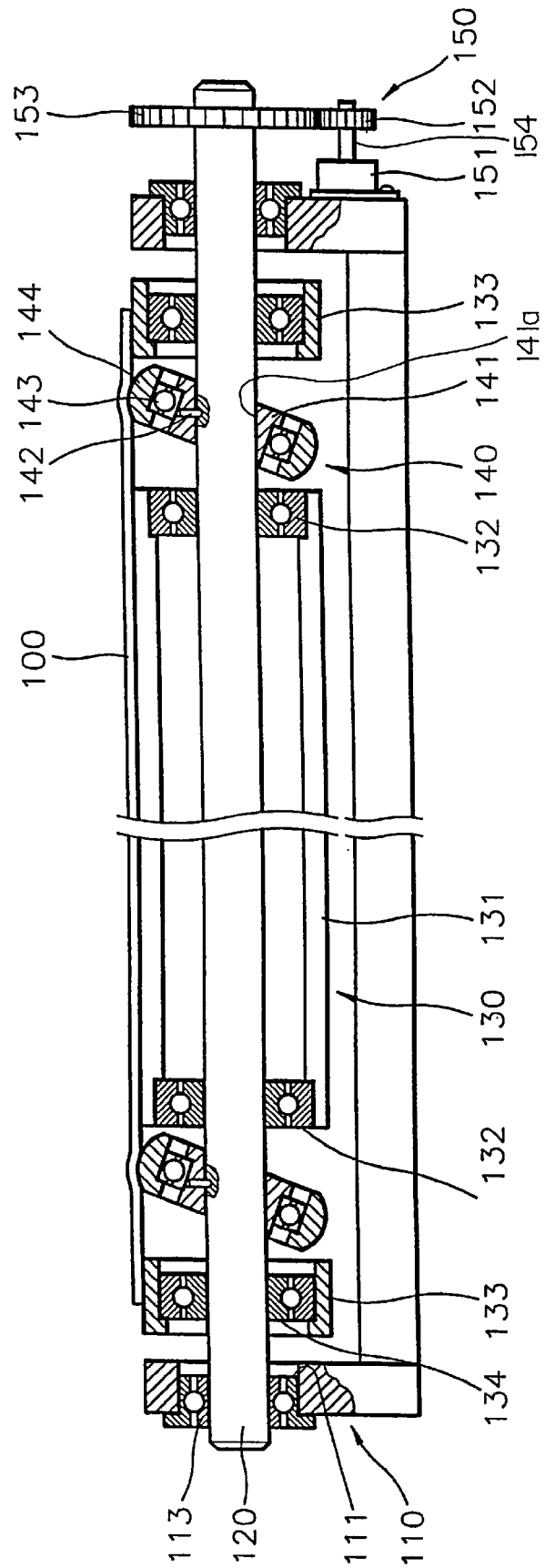
FIG. 3 is a sectional view showing a photoreceptor web steering apparatus for a printer according to a preferred embodiment of the present invention.
Figure 4:
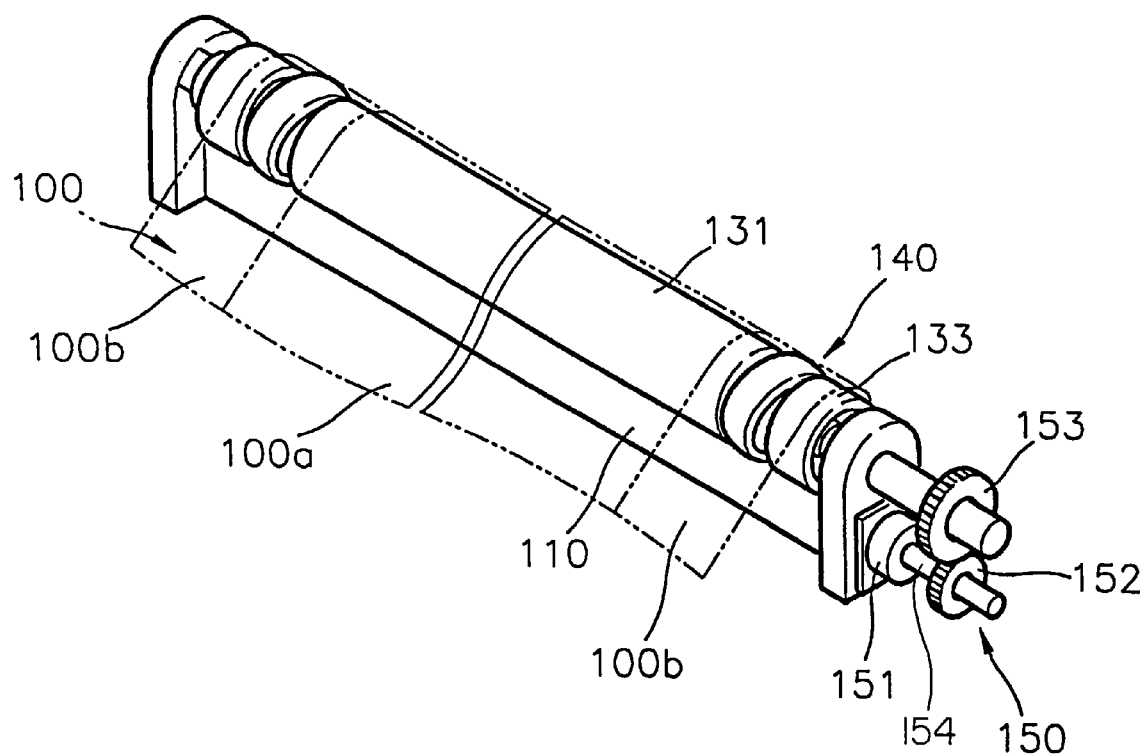
FIG. 4 is a perspective view illustrating the photoreceptor web steering apparatus for a printer according to a preferred embodiment of the present invention.

As shown in FIGS. 3 and 4, the photoreceptor web steering apparatus according to the present invention includes a frame 110, a shaft 120 rotatably installed at the frame 110, a guide roller 130 rotatably installed at the shaft 120 for guiding the circulation of the photoreceptor web 100, a steering roller 140 arranged next to the guide roller 130 for correcting a lateral slip of the photoreceptor web 100, and a driving means 150 installed between the frame 110 and the shaft 120 for controlling the degree of pivot of the shaft 120.

The frame 110 has a structure in which both ends thereof face each other and are separated by a predetermined distance so that both ends of the shaft 120 can be rotatably installed. Also, the frame 110 has an installation groove 111 for installing the shaft 120.

A first bearing 113 for supporting the shaft 120 to be capable of rotating with respect to the frame 110 is installed in the installation groove 111. A guide roller 130 and a steering roller 140 are rotatably installed at the outer circumferential surface of the shaft 120.

The guide roller 130 is in contact with the photoreceptor web 100 at a portion of the outer circumference thereof, and guides the circulation of the photoreceptor web 100. The guide roller 130 is a hollow cylindrical roller and rotatably installed at the shaft 120 by a plurality of second bearings 132 and 134. The guide roller 130 can include a first guide roller 131 for supporting an image area 100a of the photoreceptor web 100 and a pair of second guide rollers 133, arranged spaced apart from the first guide roller 131, for supporting both ends of the photoreceptor web 100. Here, the steering roller 140 is disposed between the first guide roller 131 and the second guide roller 133 to correct a lateral slip of the photoreceptor web 100.

The steering roller 140 is installed at an angle at the shaft 120 around the guide roller 130 and the direction of the angle is determined by the pivot angle of the shaft 120. Accordingly, the degree of inclination at a portion contacting the photoreceptor web 100 of the steering roller 140 is adjusted so that the lateral slip of the photoreceptor web 100 is corrected. Preferably, the steering roller 140 is installed to support the non-image area 100b of the photoreceptor web 100.

Thus, the steering roller 140 includes a spacer 141 installed to tilt at a predetermined angle with respect to the outer circumferential direction of the shaft 120, a tilting shell 144 rotatably installed on the outer circumference of the spacer 141 having the same angle of inclination as the spacer 141, and a third bearing 143 arranged between the spacer 141 and the tilting shell 144.

The spacer 141 has a hole 141a of a diameter corresponding to the outer diameter of the shaft 120 so that the spacer 141 can be coupled to the shaft 120 at an angle. The hole 141a is formed to be angled with respect to the outer circumference of the shaft 120, and thus, the spacer 141 is arranged to be angled when the hole 141a is coupled to the shaft 120. Here, a coupling groove is formed in the shaft 120 and a coupling hole is formed in the spacer 141. The spacer 141 can be fixed to the shaft 120 when a set screw 142 is assembled to the coupling groove through the coupling hole.

The tilting shell 144 is rotatably installed at the outer circumference of the spacer 141 by the third bearing 143 and is in contact with the photoreceptor web 100 to correct a lateral slip of the shaft 120 in a longitudinal direction thereof. The outer circumferential surface of the tilting shell 144 preferably has a round shape to increase the area in contact with the photoreceptor web 100. That is, the area of the portion contacting the photoreceptor web 100 can be increased by curving a portion of the photoreceptor web 100 contacting the outer circumference of the tilting shell 144, which can be performed by making the height of both end portions of the tilting shell 144 to be the same as that of the neighboring guide roller 130 and making the height of the central portion of the tilting shell 144 to be higher than that of the guide roller 130. Also, it is preferable that the outer circumferential surface of the tilting shell 144 has a processed surface, e.g., made by a rubbing process, in order to increase the frictional force between the photoreceptor web 100 and the tilting shell 144.

Although the steering roller 140 is provided at both sides of the guide roller 140 in the above description, it may provided at only one side of the guide roller 140.

The driving means 150 is installed at the frame 110 and the shaft 120. The driving means 150 controls the rotational position of the shaft 120 to correct a lateral slip of the photoreceptor web 100 by adjusting the tilting angle of the steering roller 140. Thus, the driving means 150 includes a driving source 151 for providing a rotational force, and gear members 152 and 153 for transferring the rotational force provided from the driving source 151 to the shaft 120.

The driving source 151 has a rotational shaft 154 installed at the frame 110 to rotate. The gear members include a first gear 152 rotating around the rotational shaft 154, and a second gear 153 rotating around the shaft 120 being engaged with the first gear 152.

Here, it is possible that the rotational position of the shaft 120 can be controlled by arranging the rotational shaft 154 of the driving source 151 to be couple with the shaft 120 without the gear members 152 and 153.

Hereinafter, the operation of the photoreceptor web steering apparatus according to the preferred embodiment of the present invention will be described with reference to FIGS. 5–7.

Figure 5:
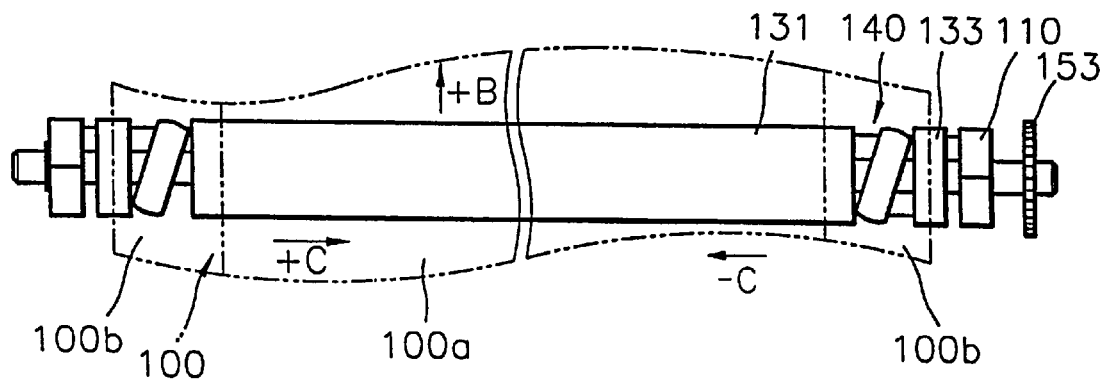
FIGS. 5–7 are views for showing the operation of the photoreceptor web steering apparatus for a printer according to a preferred embodiment of the present invention.

As shown in FIG. 5, when the photoreceptor web 100 circulating in a direction indicated by arrow "+B", has a lateral slip in a direction indicated by arrow "−C", the steering roller 140 is pivoted clockwise by rotating the shaft 120 such that a portion contacting the photoreceptor web 100 can tilt to the right from a planar view. Accordingly, the photoreceptor web 100 moves in a direction indicated by arrow "+C". Thus, a force in the direction of rotation of the guide roller 130 and a steering force in the "+C" direction according to the degree of tilt of the steering roller 140 are applied to the photoreceptor web 100 so that the photoreceptor web 100 gradually moves in the "+C" direction as it rotates, to thereby correct the lateral slip of the photoreceptor web 100 in the "−C" direction.

Figure 6:
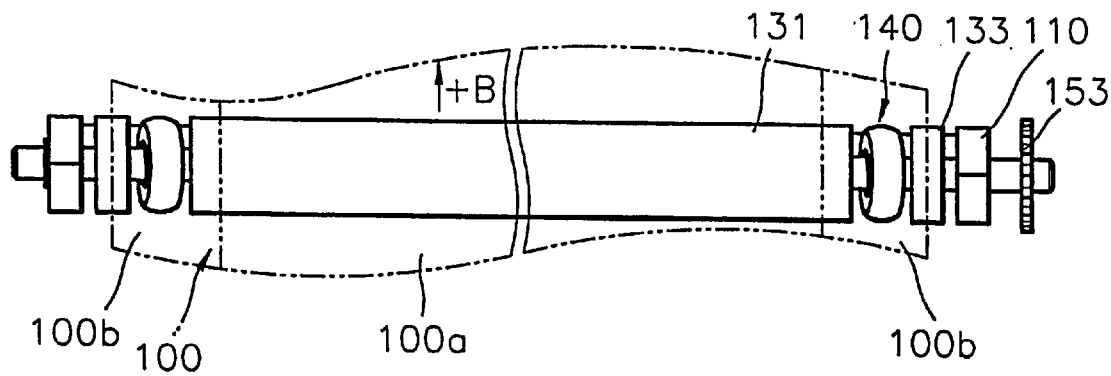

As shown in FIG. 6, when the photoreceptor web 100 rotates without a lateral slip, the steering roller 140 is arranged parallel to the radius direction of the shaft 120 from the planar view. Thus, a force in the longitudinal direction of the shaft 120 is not applied to the photoreceptor web 100.

Figure 7:
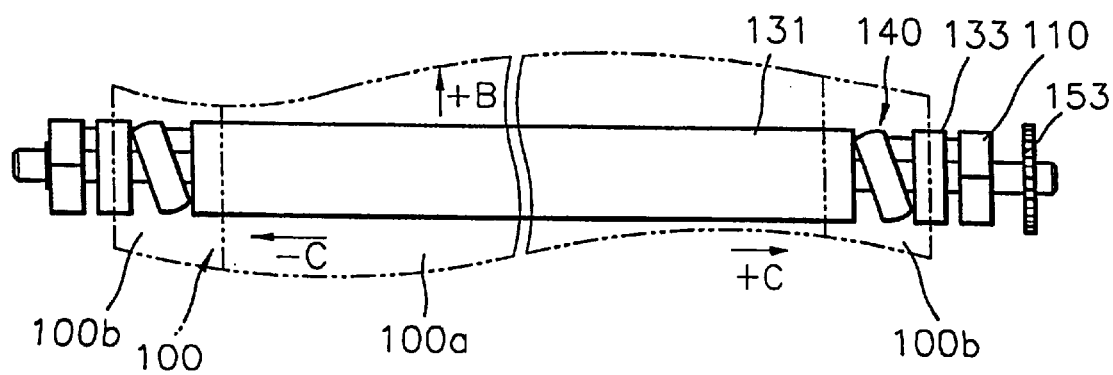

As shown in FIG. 7, when the photoreceptor web 100 slips laterally in the "+C" direction, the shaft 120 is rotated by the driving means 150 to pivot the steering roller 140 counterclockwise at a predetermined angle. Thus, a force in a rotational direction of the guide roller 130 and a steering force in the "−C" direction according to the pivot angle of the steering roller 140 are applied to the photoreceptor web 100. Accordingly, the photoreceptor web 100 moves in the "−C" direction as it rotates so that the lateral slip of the photoreceptor web 100 in the "+C" direction can be corrected.

As described above, the photoreceptor web steering apparatus for a printer according to the present invention is rotatably installed at the shaft 120 so that a lateral slip of the photoreceptor web 100 can be corrected according to the pivot of the steering roller 140 without tilting the guide roller 130 which guides the rotation of the photoreceptor web. Also, a pair of stabilizing rollers which are required in the conventional apparatus are not needed so that the size of the entire steering apparatus can be made compact.

It is conceivable that numerous modifications may be made to the photoreceptor web steering apparatus for a printer of the present invention without departing from the spirit and scope of the invention as defined in the following claims.

What is claimed is:

1. A photoreceptor web steering apparatus for a printer comprising:
   a frame;
   a shaft rotatably installed at said frame;
   a guide roller, rotatably installed at said shaft, for guiding circulation of a photoreceptor web having an image area having at least one side, and a plurality of non-image areas located at each side of the image area, as a portion of an outer circumference of said guide roller supports said image area;
   a steering roller, arranged at said shaft next to said guide roller as a portion of an outer circumference of said shaft, said steering roller supporting at least one of the non-image areas, and comprising:
      a spacer installed on said outer circumference of said shaft to tilt at a predetermined angle with respect to an outer circumferential direction of said shaft; and
      a tilting shell rotatably installed on an outer circumference of said spacer and having an outer circumferential surface of said tilting shell being in contact with said photoreceptor web, said tilting shell correcting a lateral slip of said photoreceptor web which contacts an outer circumference of said tilting shell, by changing an inclination direction of said spacer according to a rotational position of said shaft; and
   means for driving said shaft, said driving means installed at said frame and said shaft, for controlling a rotational position of said shaft;
   wherein said outer circumferential surface of said tilting shell is a processed surface to increase a frictional force between said photoreceptor web and said tilting shell.

2. The photoreceptor web steering apparatus for a printer as claimed in claim 1, wherein the outer circumferential surface of said tilting shell has a round shape to increase an area in contact with said photoreceptor web.

3. The photoreceptor web steering apparatus for a printer as claimed in claim 1, wherein said driving means comprises:
   a driving source, installed at said frame for driving a rotational shaft and for providing a rotational force; and
   a gear member, disposed at said rotational shaft and said shaft, for transferring the rotational force provided from said driving source to said shaft.

4. The photoreceptor web steering apparatus for a printer as claimed in claim 1, wherein said tilting shell has a central portion and two end portions, and a height of said two end portions of said tilting shell is the same as that of said guide roller, and a height of said central portion of said tilting shell is higher than that of said guide roller.

5. The photoreceptor web steering apparatus for a printer as claimed in claim 1, wherein said spacer comprises a hole whose diameter corresponds to an outer diameter of said shaft so that said spacer can be coupled to said shaft at an angle.

6. A photoreceptor web steering apparatus for a printer comprising:
   a frame;
   a shaft rotatably installed at said frame;
   a guide roller, rotatably installed at said shaft, for guiding circulation of a photoreceptor web as a portion of an outer circumference of said guide roller contacts said photoreceptor web;
   a steering roller, arranged at said shaft next to said guide roller and comprising:
      a spacer installed to tilt at a predetermined angle with respect to an outer circumferential direction of said shaft; and
      a tilting shell rotatably installed on an outer circumference of said spacer and having an outer circumferential surface of said tilting shell being in contact with said photoreceptor web, said tilting shell correcting a lateral slip of said photoreceptor web which contacts an outer circumference of said tilting shell, by changing an inclination direction of said spacer according to a rotational position of said shaft;
      wherein said tilting shell has a central portion and two end portions, and a height of said two end portions of said tilting shell is the same as that of said guide roller, and a height of said central portion of said tilting shell is higher than that of said guide roller; and
   means for driving said shaft, said driving means installed adjacent said frame and said shaft, for controlling a rotational position of said shaft.

7. A photoreceptor web steering apparatus for a printer comprising:
   a frame;
   a shaft rotatably installed at said frame;
   a guide roller, rotatably installed at said shaft, for guiding circulation of a photoreceptor web as a portion of an outer circumference of said guide roller contacts said photoreceptor web;
   a steering roller, arranged at said shaft next to said guide roller and comprising:
      a spacer installed to tilt at a predetermined angle with respect to an outer circumferential direction of said shaft; and a tilting shell rotatably installed on an outer circumference of said spacer and having an outer circumferential surface of said tilting shell being in contact with said photoreceptor web, said tilting shell correcting a lateral slip of said photoreceptor web which contacts an outer circumference of said tilting shell, by changing an inclination direction of said spacer according to a rotational position of said shaft;

wherein said tilting shell has a central portion and two end portions, and a height of said two end portions of said tilting shell is the same as that of said guide roller, and a height of said central portion of said tilting shell is higher than that of said guide roller; and means for driving said shaft, said driving means installed adjacent said frame and said shaft, for controlling a rotational position of said shaft;

wherein the outer circumferential surface of said tilting shell has a round shape to increase an area in contact with said photoreceptor web; and wherein said outer circumferential surface of said tilting shell is a processed surface to increase a frictional force between said photoreceptor web and said tilting shell.

8. A photoreceptor web steering apparatus for a printer comprising:

a frame;

a shaft rotatably installed at said frame;

a guide roller, rotatably installed at said shaft, for guiding circulation of a photoreceptor web as a portion of an outer circumference of said guide roller contacts said photoreceptor web;

a steering roller, arranged at said shaft next to said guide roller and comprising:

a spacer installed to tilt at a predetermined angle with respect to an outer circumferential direction of said shaft; and a tilting shell rotatably installed on an outer circumference of said spacer and having an outer circumferential surface of said tilting shell being in contact with said photoreceptor web, said tilting shell correcting a lateral slip of said photoreceptor web which contacts an outer circumference of said tilting shell, by changing an inclination direction of said spacer according to a rotational position of said shaft;

wherein said tilting shell has a central portion and two end portions, and a height of said two end portions of said tilting shell is the same as that of said guide roller, and a height of said central portion of said tilting shell is higher than that of said guide roller; and means for driving said shaft, said driving means installed adjacent said frame and said shaft, for controlling said rotational position of said shaft;

wherein said steering roller is installed to support at least one non-image area of a plurality of non-image areas located at each side of an image area of said photoreceptor web; and wherein the outer circumferential surface of said tilting shell has a round shape to increase an area in contact with said photoreceptor web; and wherein said outer circumferential surface of said tilting shell is a processed surface to increase a frictional force between said photoreceptor web and said tilting shell.

* * * * *